(12) United States Patent
Landry et al.

(10) Patent No.: US 11,267,564 B2
(45) Date of Patent: Mar. 8, 2022

(54) AIRCRAFT WITH ROTATING DUCTED FAN

(71) Applicant: Bell Textron Inc., Fort Worth, TX (US)

(72) Inventors: Martin Landry, Prevost (CA);
Mathieu Beland, Mirabel (CA);
Maxime Lapalme,
Saint-Lin-Laurentides (CA)

(73) Assignee: Textron Innovations Inc., Providence, RI (US)

( * ) Notice: Subject to any disclaimer, the term of this patent is extended or adjusted under 35 U.S.C. 154(b) by 147 days.

(21) Appl. No.: 16/659,829

(22) Filed: Oct. 22, 2019

(65) Prior Publication Data

US 2021/0114720 A1 Apr. 22, 2021

(51) Int. Cl.
*B64C 29/00* (2006.01)
*B64C 27/52* (2006.01)
*B64C 27/28* (2006.01)
*B64C 27/20* (2006.01)

(52) U.S. Cl.
CPC .............. *B64C 27/28* (2013.01); *B64C 27/20* (2013.01); *B64C 27/52* (2013.01); *B64C 29/0033* (2013.01)

(58) Field of Classification Search
CPC ..... B64C 29/0033; B64C 27/20; B64C 27/28; B64C 27/52
See application file for complete search history.

(56) References Cited

U.S. PATENT DOCUMENTS

| | | | |
|---|---|---|---|
| 3,868,073 A * | 2/1975 | King | B64C 39/066 244/34 A |
| 7,032,861 B2 | 4/2006 | Sanders, Jr. et al. | |
| 7,044,422 B2 | 5/2006 | Bostan | |
| 9,776,710 B2 * | 10/2017 | Duke | F03D 1/0675 |
| 10,994,838 B2 * | 5/2021 | DeLorean | B64C 39/12 |
| 2008/0048065 A1 * | 2/2008 | Kuntz | B64C 39/024 244/17.23 |
| 2015/0274289 A1 * | 10/2015 | Newman | B64C 29/0025 244/12.4 |
| 2018/0208305 A1 * | 7/2018 | Lloyd | B60L 50/61 |
| 2018/0257772 A1 * | 9/2018 | Bernhardt | B64C 35/00 |
| 2018/0297695 A1 * | 10/2018 | Ramirez-Serrano | B64C 27/08 |
| 2020/0062377 A1 * | 2/2020 | Reichensperger | B64C 11/001 |
| 2020/0172234 A1 * | 6/2020 | Neff | B64C 37/00 |
| 2020/0223530 A1 * | 7/2020 | Carpenter, Jr. | B64C 11/46 |
| 2021/0009264 A1 * | 1/2021 | Chang | B64C 3/38 |

* cited by examiner

*Primary Examiner* — Philip J Bonzell
*Assistant Examiner* — Tye William Abell
(74) *Attorney, Agent, or Firm* — Lawrence Youst PLLC

(57) ABSTRACT

An aircraft includes a fuselage, and a wing extending from the fuselage along a spanwise axis. A section of the wing is rotatable about the spanwise axis. A ducted fan is mounted to the section of the wing. The ducted fan has a hub configured to be drivingly engaged by an engine. The hub is rotatable about a fan axis. Blades protrude from the hub between roots mounted to the hub and tips radially spaced from the hub. A duct circumferentially extends about the fan axis and is mounted to the tips of the blades to rotate with the blades about the fan axis. The section of the wing and the ducted fan are rotatable about the spanwise axis between a hover mode in which the fan axis is substantially perpendicular to a ground, and an aircraft mode in which the fan axis is substantially parallel to the ground.

18 Claims, 4 Drawing Sheets

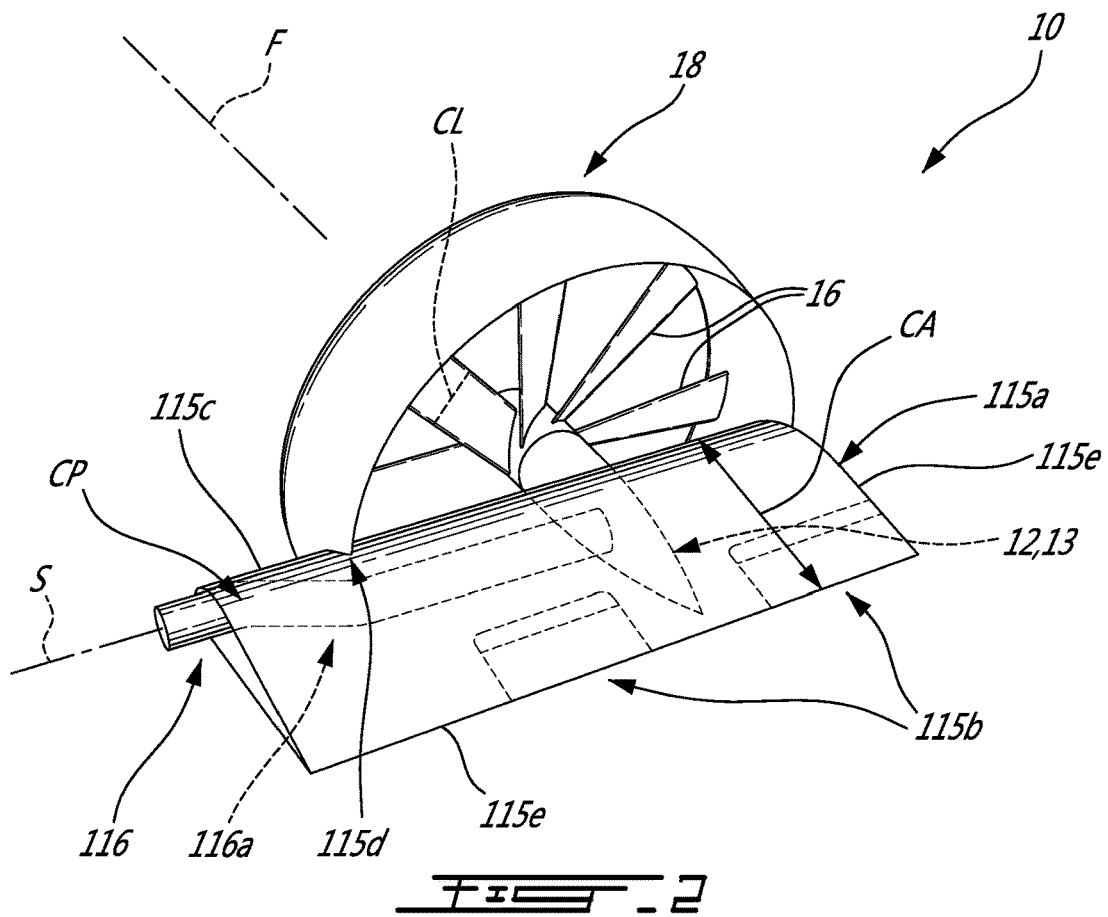
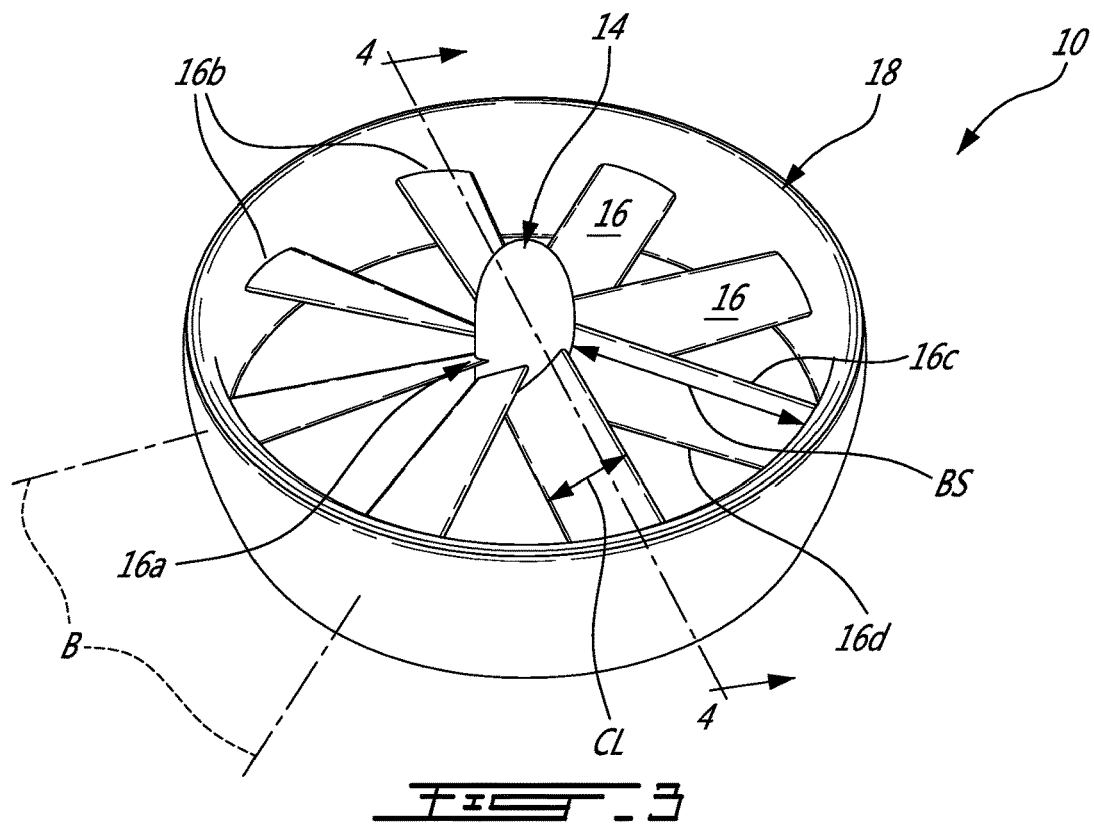

AIRCRAFT WITH ROTATING DUCTED FAN

TECHNICAL FIELD OF THE DISCLOSURE

This application relates generally to aircraft, such as tiltrotor aircraft also referred to as VTOL (Vertical Take-Off and Landing) vehicles and, more particularly, to propulsion systems for tiltrotor aircraft.

BACKGROUND

Tiltrotor aircraft are hybrids between traditional helicopters and traditional propeller driven aircraft. Typical tiltrotor aircraft have rotor systems that are capable of articulating relative to the aircraft fuselage. Tiltrotor aircraft are capable of converting from a hover mode, in which the aircraft can take-off, hover, and land like a helicopter; to an aircraft mode, in which the aircraft can fly forward like a fixed-wing airplane.

SUMMARY

There is disclosed a ducted fan for an aircraft, comprising: a hub rotatable about a fan axis; blades protruding radially from the hub between roots mounted to the hub and tips radially spaced from the hub, the blades having leading edges and trailing edges each extending along blade spans from the roots to the tips; and a duct circumferentially extending about the fan axis and mounted to the tips of the blades to rotate with the blades about the fan axis, the duct extending at least axially along to the fan axis from a duct leading edge to a duct trailing edge, an entirety of the leading edges of the blades located rearward of the duct leading edge, the duct supported around the hub solely by the blades.

There is disclosed an aircraft comprising: a fuselage; a wing extending from the fuselage along a spanwise axis, a section of the wing rotatable about the spanwise axis and relative to the fuselage; and a ducted fan mounted to the section of the wing, the ducted fan having a hub configured to be drivingly engaged by an engine, the hub rotatable about a fan axis, blades protruding from the hub between roots mounted to the hub and tips radially spaced from the hub, and a duct circumferentially extending about the fan axis and mounted to the tips of the blades to rotate with the blades about the fan axis; the section of the wing and the ducted fan rotatable about the spanwise axis between a hover mode in which the fan axis is substantially perpendicular to a ground, and an aircraft mode in which the fan axis is substantially parallel to the ground.

BRIEF DESCRIPTION OF THE DRAWINGS

Reference is now made to the accompanying figures in which:

FIG. 2 is a schematic three dimensional view of a ducted fan secured to a section of a wing of the tiltrotor aircraft of FIG. 1a;

FIG. 3 is a schematic top three dimensional view of the ducted fan of FIG. 2.

DETAILED DESCRIPTION

Figure 1:
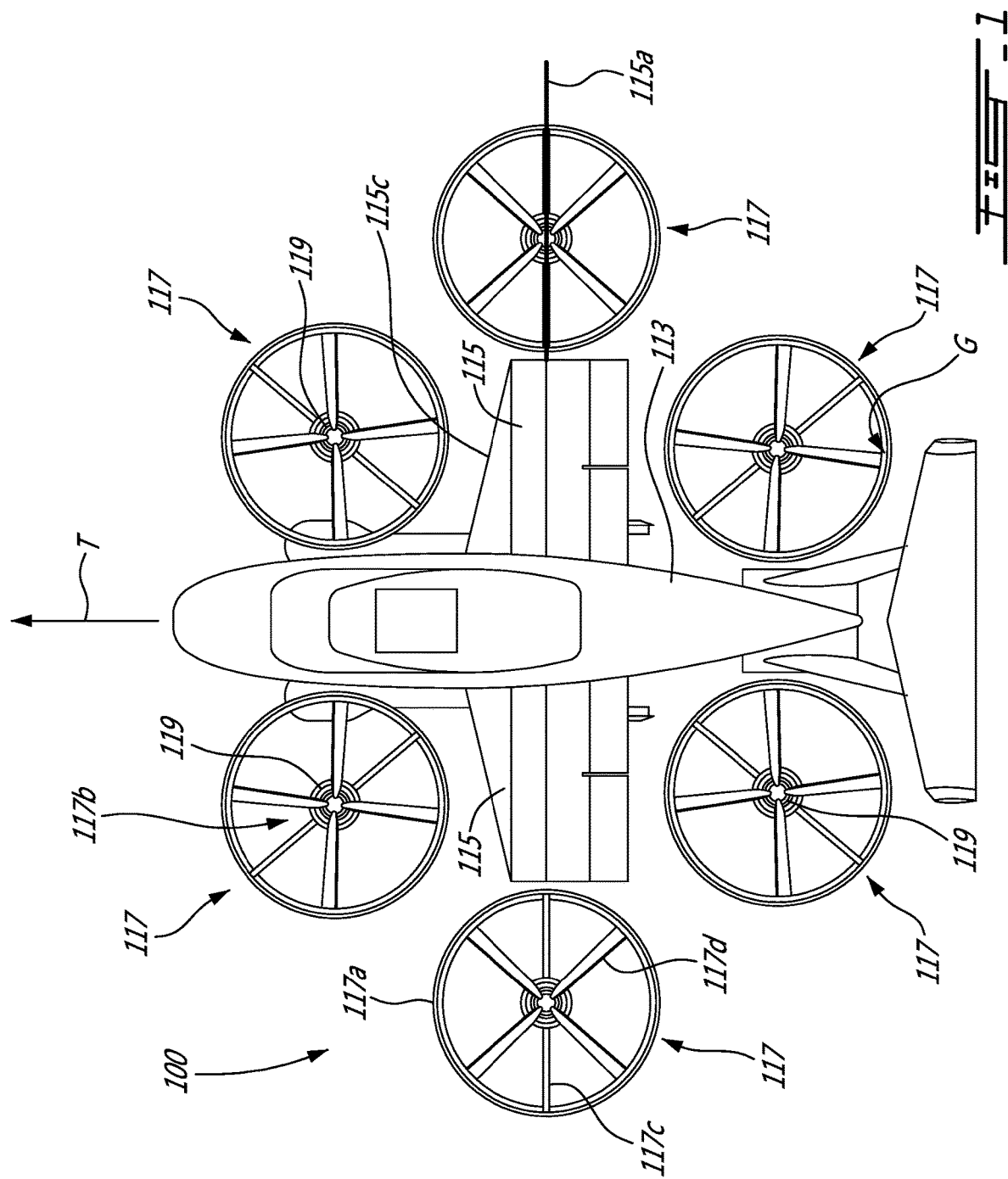
FIG. 1 is a schematic top view of a tiltrotor aircraft having ducted fan in accordance with one embodiment.

A possible embodiment of an aircraft 100 is shown in FIG. 1. The aircraft 100 may be a manned aircraft, and has a fuselage 113 with wings 115 extending from the fuselage 113. Ducted fans 117 are secured to the fuselage 113 and the wings 115, and rotate relative to the fuselage 113. As shown in FIG. 1, a tip section 115a of the wing 115 is rotatable relative to the fuselage 113 and relative to a remainder of the wing 115 about a spanwise axis S. The two ducted fans 117 that are mounted to the wings 115 may be mounted to the tip sections 115a of the wings 115 for rotation therewith about the spanwise axis S between a hover mode and an aircraft mode. The wing section 115a is shown in the hover mode in FIG. 1 and in the aircraft mode in FIG. 1a. It is understood that the ducted fans 117 may be alternatively mounted to any section or portion of the wings 115. For instance, the ducted fans 117 may be mounted to middle sections of the wings 115 located between root sections and the tip sections 115a.

The aircraft 100 is shown in the hover mode in FIG. 1. A position of the tip section 115a of one of the wings 115 is shown in dashed lines in FIG. 1a in the aircraft mode. In the hover mode, the ducted fans 117 are oriented such that central axes of the ducted fans 117 are oriented substantially perpendicular to a ground when the aircraft 100 is on the ground, or hovering above it. In the aircraft mode, the central axes of the ducted fans 117 are oriented substantially parallel to the ground. In the hover mode, a main component of a thrust vector generated by the fans 117 is in a direction perpendicular to the ground whereas, in the aircraft mode, the main component is in a direction substantially parallel to the ground.

In the embodiment shown, each of the ducted fans 117 has a duct 117a, a hub 117b, struts 117c, also referred to as stators, extending from the hub 117b to the duct 117a, and blades 117d secured to the hub 117b at their roots. The struts 117c are used to maintain a relative radial position of the duct 117a relative to the hub 117b. Radial gaps G are present between tips of the blades 117d and the duct 117a to allow the blades 117d to rotate relative to the duct 117a. The smaller are the radial gaps between the tips of the blades 117d and the duct 117a the better are the performances of the ducted fans 117. Indeed, small radial gaps may allow to reduce size of tip vortex and may allow to avoid blade bending.

However, the duct 117a needs to be very rigid to maintain very small gaps while preventing contacts between the blades 117d and the duct 117a under all conditions (e.g., turbulences, side loads, high angle of attacks). Such rigid ducts 117a are heavy and ducted fans 117 are typically heavier than an opened propeller for the same thrust. The struts 117c are, similarly to the duct 117a, rigid and heavy. Moreover, the interaction of the flow around the blades 117d and the struts 117c creates noise.

Figure 1A:
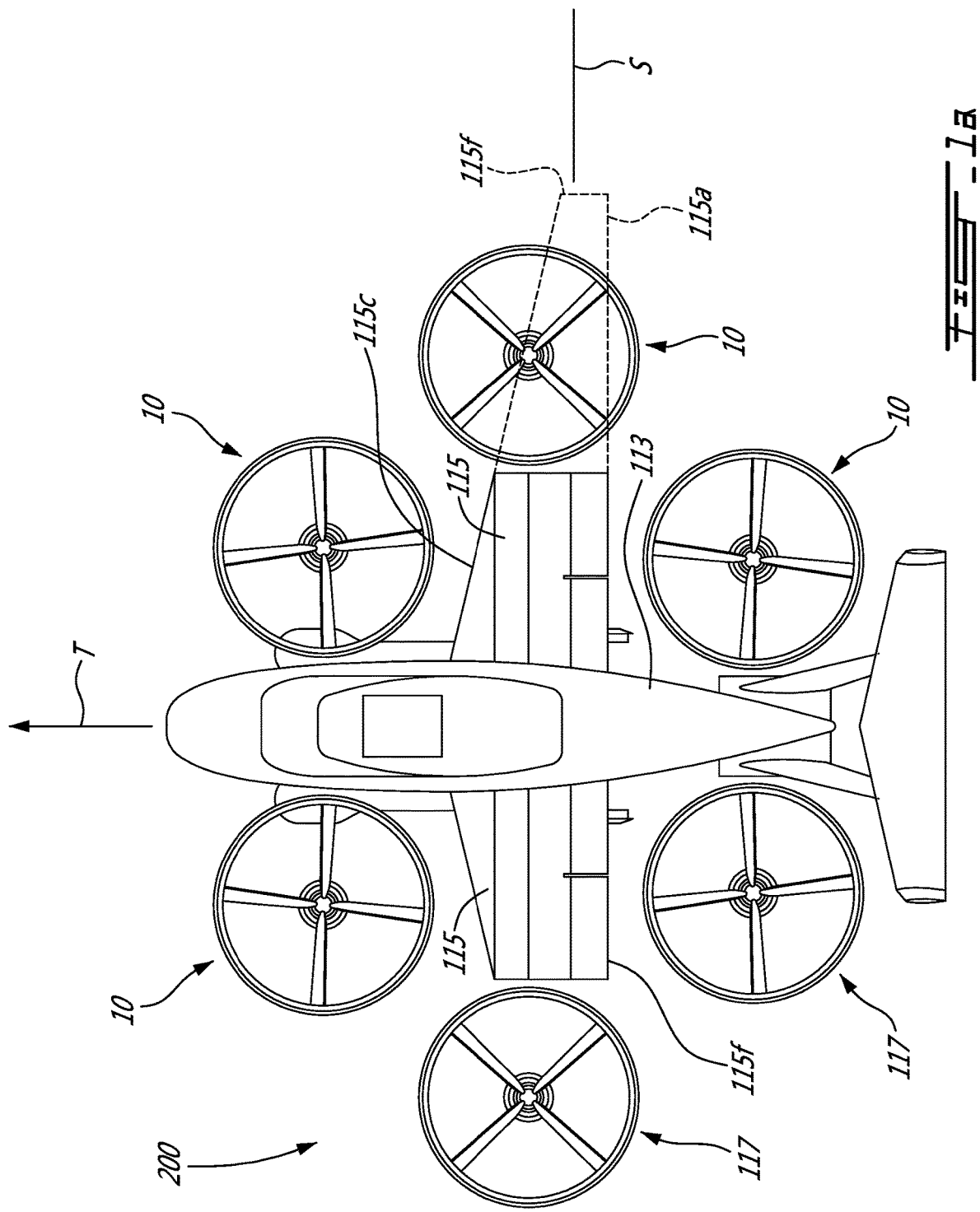
FIG. 1a is a schematic top view of the tiltrotor aircraft of FIG. 1 equipped with ducted fans in accordance with another embodiment.

Referring now to FIGS. 1a and 2, a tiltrotor aircraft having ducted fans 10 in accordance with another embodiment is shown generally at 200. The ducted fan 10 is shown mounted to the tip section 115a of the wing 115. As shown, a portion of the tip section 115a of the wing 115 is intersected by a flow of air suctioned or pushed by the ducted fan 10. Said portion may be located upstream or downstream of the ducted fan 10 when the aircraft 200 is in the hover mode. The ducted fan 10 and the tip section 115a are both rotatable about the spanwise axis S of the wing 115. In the embodiment shown, both of the tip section 115a of the wing 115 and the ducted fan 10 are rotatable about the spanwise axis S between the hover mode of the aircraft 200 and the aircraft mode of the aircraft 10. In a particular embodiment, an entirety of the wings 115 is rotatable about the spanwise axis S. In a particular embodiment, rotating both of the tip section 115a of the wing 115 and the ducted fan 10 may allow for generating lift with the tip section 115a of the wing 115.

In FIG. 2, the tip section 115a of the wing 115 is pivotally mounted to a remainder of the wing 115 via a spar 116. The spar 116 may define a pivot point of the tip section 115a of the wing 115. The spar 116 may define the spanwise axis S about which the spar 116 rotates. In the embodiment shown, the spar 116 is located proximate, or at, a center of pressure CP of the tip section 115a of the wing 115. The spar 116 extends through the center of pressure CP of the tip section 115a. In a particular embodiment, rotating the tip section 115a of the wing 115 about the center of pressure CP may allow for minimizing the loads on the spar 116 since a pitching moment on the tip section 115a of the wing 115 may be zero at the center of pressure CP regardless of the angle of attack of the tip section 115a of the wing 115 with the oncoming flow. The spar 116 is a structural component of the wing 115 and is able to withstand aerodynamic and structural loads applied on the wing 115.

Referring to FIGS. 2-3, the ducted fan 10 is described in more detail. The ducted fan 10 includes an engine 12 surrounded by a nacelle 13. The nacelle 13 defines a portion of an external surface of the wing 115. The engine 12 may be any suitable engine such as a gas turbine engine, an internal combustion engine, and/or an electric motor. In the embodiment shown, the engine 12 is secured to the spar 116 of the tip section 115a of the wing 115. In the depicted embodiment, the engine 12 is secured to the tip section 115a of the wing 115. In the embodiment shown, the aircraft 200 is a puller configuration as the ducted fans 10 are located forward of the wings 15. Alternatively, a pusher configuration, in which the ducted fans 10 are located rearward of the wings 115, may be used. As the ducted fan 10 is secured to the tip section 115a of the wing 115, an angle between the fan axis F and a chord-wise axis CA extending from a leading edge 115c of the wing at the tip section 115a to a trailing edge 115f thereof remains substantially constant regardless of an angle between the chord-wise axis CA and the ground. In the embodiment shown, the fan axis F is parallel to the chord-wise axis CA of the tip section 115a of the wing 115. In a particular embodiment, the fan axis F is oriented relative to the tip section 115a of the wing 115 such that an aerodynamic force on the tip section 115a of the wing 115 created by an airflow induced by the ducted fan 10 is zero in a direction normal to both of the fan axis F and the spanwise axis S. In other words, the flow generated by the ducted fan 10 produces no lift on the tip section 115a of the wing 115. The angle between the fan axis F and the chord-wise axis CA can be optimized for performances. In the embodiment shown, the fan axis F is parallel to the chord-wise axis CA.

The ducted fan 10 has a hub 14, blades 16, and a duct 18 all of which rotate about the fan axis F. The hub 14 is in driving engagement with the engine 12 either directly or via a transmission, gearbox, or other suitable transmission means. The engine 12 may be secured to the wing 115. The engine 12 may be located anywhere in the aircraft 10, for instance within the fuselage 113, and drivingly engaged to the hub 14 via any suitable transmission means such as a gearbox. In the embodiment shown, the hub 14 is secured to a shaft of the engine 12 and both rotate together about the fan axis F. Rotation of the ducted fan 10 is driven by the hub 14, which is itself rotated by the engine 12. The blades 16 protrude radially outwardly from the hub 14 and have roots 16a secured to the hub 14 and tips 16b that are radially offset from the roots 16a outwardly from the fan axis F. The blades 16 extend along blade spans BS (FIG. 4) from the roots 16a to the tips 16b. The blades 16 have leading edges 16c and trailing edges 16d. The blades 16 may be airfoil shaped. The duct 18 circumferentially extends all around the fan axis F and around the blades 16. In the embodiment shown, the tips 16b of the blades 16 are secured to the duct 18. In the embodiment shown, the hub 14, the blades 16, and the duct 18 all rotate together about the fan axis F. There is no relative rotation between the hub 14, the blades 16, and the duct 18 about the fan axis F. In a particular embodiment, the tips 16b of the blades 16 are located at a center of pressure of the duct 18. The blades 16 may be located at any axial position relative to a chord L of the duct 18.

The hub 14, blades 16, and duct 18 may be made of a monolithic piece of material. The hub 14, blades 16, and the duct 18 may be manufactured as a single unit. Alternatively, the hub 14, the blades 16, and the duct 18 may be manufactured separately and secured to one another in a subsequent manufacturing step. The hub 14, the blades 16, and duct 18 may be made of composite material. The hub 14, blades 16, and duct 18 may be manufactured using any suitable manufacturing techniques. In the embodiment shown, there is no structure around the duct 18 to support the duct 18. The duct 18 is supported entirely by the blades 16, and the blades 16 are supported entirely by the hub 14. The duct 18 rotates in free air.

In the embodiment shown, there are no gaps between the tips 16b of the blades 16 and the duct 18. In other words, the duct 18 and the tips 16b the blades 16 are free of a gap therebetween because the tips 16b of the blades 16 are connected to the duct 18. Since the duct 18 rotates integrally with the blades 16, there is no more need for struts to maintain a position of the duct 18 relative to the hub 14. In the present embodiment, the duct 18 is maintained and supported around the hub 14 solely with the blades 16. In a particular embodiment, the duct 18 rotating integrally with the blades 16 and the hub 14 may allow for making the blades 16 lighter compared to blades rotating free of a duct because the tip 16b is held, and not free, thereby limiting forward bending at the tip 16b of the blades 16. Efficiency of the ducted fans 10 may be increased compared to the ducted fans 117 of FIG. 1 at least because there are no gaps between the tips 16b of the blades and the duct 18. Having the tips 16b of the blades 16 secured to the duct 18 may limit damages to the tips 16b of the blades 16 and to the duct 18 thereby reducing the time for inspection and repair. Having the duct 18 supported by the blades 16 and having the tips 16b of the blades 16 secured to the duct 18 may allow making the duct 18 lighter than the duct 117a of FIG. 1 because it does not have to be located precisely to ensure minimum tip gap and it does not need to support its own weight and that of the engine 12. Having the ducted fan 10 free of struts may decrease undesired aerodynamic phenomena and noise because the stators 117c are absent. Having the ducted fans 10 free of stators may avoid scissor mode because the angles of attack of each pair circumferentially adjacent ones of the blades 16 are fixed. Fabrication techniques allow for increasing chords CL of the blades 16 at their tips 16b (where velocity is the greatest) to allow the tips 16b of the blades 16 to carry more load compared to the configuration of FIG. 1. More detail about this last aspect are presented herein below. The scissor mode is a phenomenon in which an angle of attack of an advancing blade differs from that of a retracting blade as a result of differences in aerodynamic forces exerted on the advancing blade relative to that exerted on the retracting blade. Such a phenomenon typically occurs when the aircraft flies in the direction of travel T and when the blade spans BS are substantially parallel to the oncoming airflow. This phenomenon may be avoided with the ducted fan 10 as disclosed herein because the tips 16b of the blades 16 are secured to the duct 18. In other words, having the blade tips 16b being attached to the duct 18 may restrict any angle change.

In FIGS. 2 and 3, the ducted fan 10 is free of static support structures, such as stators. Being free of stators may reduce or eliminate negative interactions between the blades 16 and stators, thereby reducing noise compared to the ducted fans 117 of FIG. 1, which include stators. In a particular embodiment, during operation of the ducted fan 117 of FIG. 1 at high angle of attack, the duct 117a may stall and generate unstable flow at the rotor inlet. This may generate unbalanced load on the duct 117a and blades 117d, which may increase the flapping of the blades 117d and might be responsible for higher noise level. With the disclosed rotating duct 18, since the tips 16b of the blades 16 are attached to the duct 18, the flapping of the blades 16 (and accompanying noise) is reduced compared to the configuration of FIG. 1 in which the tips of the blades are free.

Referring to FIG. 2, the section 115a of the wing 115 has control surfaces 115b. The control surfaces 115b may be, for instance, ailerons, spoilers, flaps, or a combination thereof, and may be used to control an attitude of the aircraft 100. In the embodiment shown, the control surfaces 115b are downstream of the ducted fan 10 along a direction parallel to the fan axis F. In other words, the control surfaces 115b may be located downstream of the ducted fan 10 and may be located within a stream tube of air delimited and captured by the duct 18. The control surfaces 115b may therefore be wetted by an air flow expelled from the ducted fan 10 or suctioned by the ducted fan 10. The control surfaces 115b may be located in the flow generated by the ducted fans 10. In a particular embodiment, having the control surfaces 115b located in the flow generated by the ducted fans 10 increases the efficiency of the control surfaces 115b at low speeds.

Figure 4:
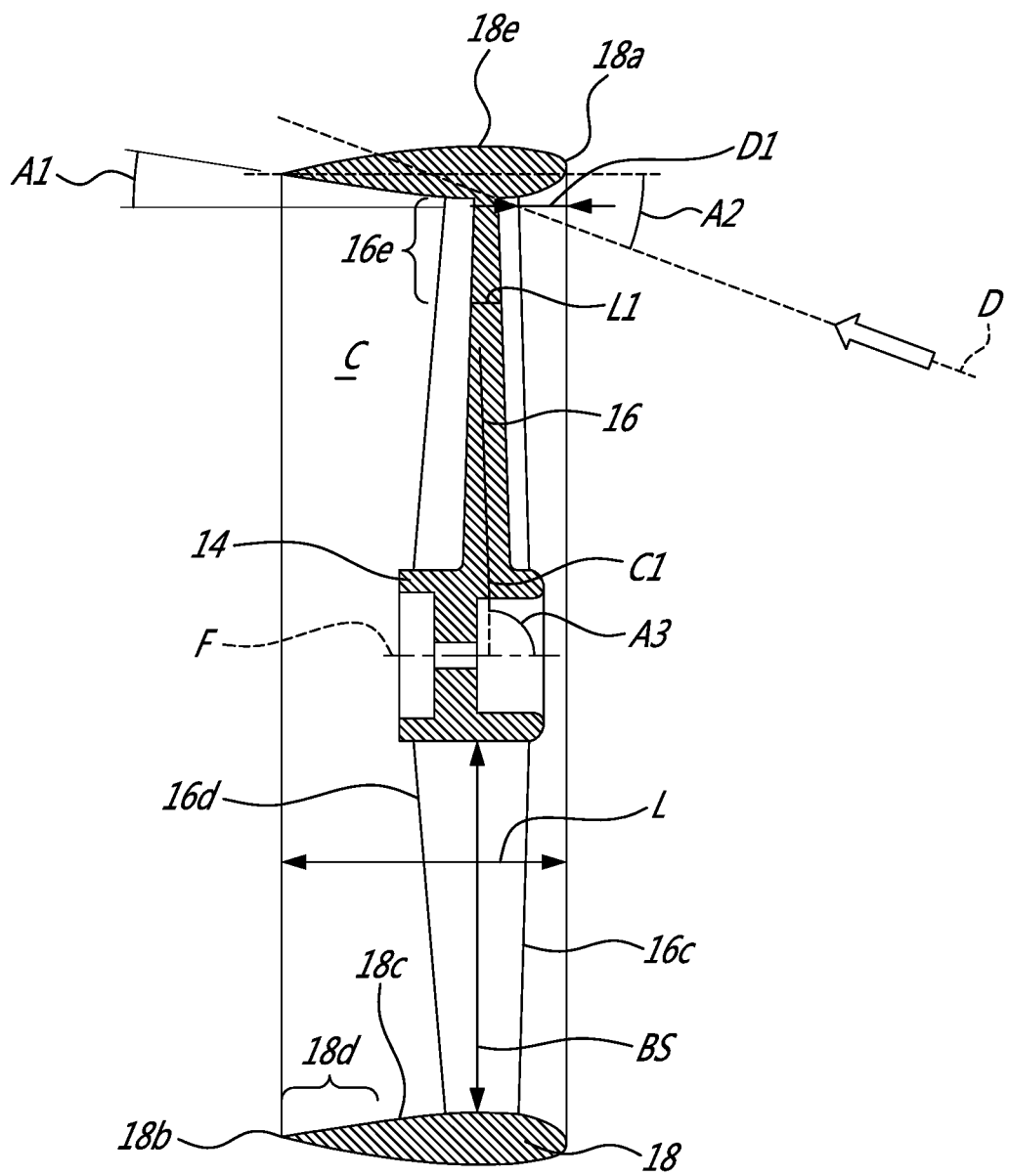
FIG. 4 is a schematic cross-sectional view of the ducted fan of FIG. 3 taken along the line 4-4 in FIG. 3.

Referring now to FIG. 4, a cross-sectional shape of the duct 18 taken in a plane containing the fan axis F is airfoil-shaped. The duct 18 may be made of a plurality of airfoil sections circumferentially distributed around the fan axis F. In the embodiment shown, the duct 18 is axisymmetric. The shape of the duct 18 may be designed to generate forward force. The duct 18 has a leading edge 18a and a trailing edge 18b. The duct 18 has an inner face 18c oriented toward the fan axis F and that defines a conduit C for receiving an airflow therein. The conduit C extends from the leading edge 18a of the duct 18 to the trailing edge 18b thereof. The conduit C has a cross-sectional area taken in a plane normal to the fan axis F that decreases from the leading edge 18a of the duct 18 toward the leading edges 16c of the blades 16, and that increases from the trailing edges 16d of the blades 16 to the trailing edge 18b of the duct 18. The cross-sectional area of the conduit C may also be shown in a plane containing the fan axis F. Increasing the cross-sectional area of the conduit C downstream of the blades 16 may allow for higher propulsion efficiency at low airspeed compared to a configuration in which the conduit C has a constant cross-sectional area. The duct 18 has an outer face 18e opposed the inner face 18c and being exposed to the airflow around the duct 18. In other words, in the embodiment shown, the outer face 18e of the duct 18 is free of contact with any other elements of the aircraft 200 and is wetted by the airflow around the aircraft 200.

Referring to FIG. 4, an entirety of the leading edges 16c of the blades 16 are located rearward of the leading edge 18a of the duct 18. In the embodiment shown, an entirety of the trailing edges 16d of the blades 16 are located forward of the trailing edge 18b of the duct 18. An angle A3 between the fan axis F and mid-chord lines C1 of the blades 16 may range from about 80 to about 100 degrees. The mid-chord lines extend along the blade spans BS and at mid-points between the leading edges 16c and the trailing edges 16d of the blades 16. The angle may vary along the blade spans BS. In the embodiment shown, the angle between the fan axis F and the blades 16 is about 90 degrees.

An angle A1 between the fan axis F and the inner face 18c of the duct 18 downstream of the blades 16 ranges from about −10 to about 20 degrees. A positive value for the angle A1 results in the cross-sectional area of the conduit C increases from the blades 16 toward the trailing edge 18b, whereas a negative value of the angle A1 results in the cross-sectional area of the conduit C decreasing from the blades 16 toward the trailing edge 18b of the duct 18. Having the cross-sectional area of the conduit C decreasing from the blades 16 toward the trailing edge 18b may allow for a higher efficiency at high airspeed compared to a configuration with a constant cross-sectional area.

The tips 16b of the blades 16 are secured to the inner face 18c of the duct 18 at a distance D1 ranging from about 10% to about 90% of a chord L of the duct 18 from the leading edge 18a of the duct 18 to the blades 16. The distance D1 may extend from the leading edge 18a of the duct 18 to leading edges 16c of the blades 16. The chord L extends from the leading edge 18a to the trailing edge 18b of the duct 18. In a particular embodiment, positioning the tips 16b of the blades 16 as such improves stall characteristics and may be beneficial for mechanical purposes.

The chord CL of the blades 16 may vary from the roots 16a to the tips 16b. In a particular embodiment, a ratio of the chord CL of the blades 16 at the tips 16b to that at the roots 16a ranges from about 10% to about 200% or more. Since there is no gap between the tips 16b of the blades 16 and the duct 18, a large chord at the tips 16b may be used without creating any tip vortex. Increasing the chord of the blades 16 at their tips 16b may increase efficiency. In some cases, a small rotating duct may induce higher rotating inflow which may impair performances compared to a larger rotating duct. The rotating inflow may reduce a relative velocity on each elements of the blades 16, which may reduce an amount of thrust produce for a give rotational speed of the ducted fan 10. It may be necessary to adjust the shape of the blades 16 when scaling the system from a subscale rotating duct to a full scale rotating duct. In a particular embodiment, the chord CL of the blades 16 increases at tip sections 16e of the blades 16; the tip sections 16e extending from a location L1 between the roots 16a and the tips 16b of the blades 16 and ending at the tips 16b of the blades 16. The tip sections 16e of the blades 16 may range from about 60% to 100% of the blade span BS extending from the roots 16a to the tips 16b. In a particular embodiment, the chord CL of the blades 16 increases continuously from the roots 16a to the tips 16b. In a particular embodiment, a ratio of the chord CL of the blades 16 at the tips 16b of the blades 16 to that at the location L1 ranges from about 100% to about 200%. A variation of the chord CL from the location L1 to the tips 16b of the blades 16 may be linear, quadratic, exponential, sinusoidal, etc. Increasing the chords CL of the blades 16 at the tip sections 16e may allow the tip sections 16e of the blades 16 to carry more load than a configuration in which the chords CL of the blades 16 do not increase at the tip sections 16b.

The angle of attack of the blades 16 relative to the incoming or oncoming flow may vary from the roots 16a of the blades to the tips 16b thereof. The angle of attack of the blades 16 relative to the flow can vary or be constant. The angle of pitch, that is the angle between the chord CL of the blades 16 and a plane normal to the fan axis F, may vary along the span BS of the blades 16. For a conventional ducted fan in which the duct does not rotate, it is required to have a small angle of attack at the tips of the blades to reduce the size of the tip vortex to increase the efficiency. For the disclosed rotating duct 18, a larger angle of attack at the tips 16b of the blades 16 may be used compared to a ducted fan in which the duct is non-rotating. The angle between the chord CL of the blades 16 at their tips 16b and the plane normal to the fan axis F may be about 5 degrees or more.

Referring to FIGS. 2 and 4, the leading edge 115c of the wing 115 defines a notch 115d. An aft section 18d of the duct 18, which extends from the trailing edge 18b toward the leading edge 18a thereof, is received within the notch 115d. The notch 115d is sized to allow relative movement between the duct 18 and the leading edge 115c of the wing 115 as the duct 18 rotates about the fan axis F, and to reduce or eliminate contact between the duct 18 and the leading edge 115c. In a particular embodiment, a length of the aft section 18d of the duct 18 that is received within the notch 115d ranges from about 0% to about 70% of the chord L of the duct 18. The leading edge 18a of the duct 18 is outside the notch 115d. Referring to FIG. 2, the spar 116 curves away from the leading edge 115c of the wing 115 to go around the notch 115d such that the spar 116 is free of an intersection with the notch 115d and deviates around the notch 115d. The spar 116 may have a kink 116a to deviate around the notch 115d. Receiving the aft section 18d of the duct 18 within the notch 115d may allow for minimising a distance along the fan axis F between the leading edge 115c of the wing 115 and the trailing edges 16c of the blades 16. Structurally, it may be a better design to have the motor mounted close to the spar 116 to reduce undesired moments. This may be true when rotating the tip section 115a of the wing 115. The center of pressure of the duct 18 may be closer to the rotating point of the tip section 115a of the wing 115, which may allow for making an assembly of the tip section 115a of the wing 115 and the ducted fan 10 lighter.

In FIG. 2, the notch 115d is defined by the leading edge 115c of the wing 115 at the tip section 115a of the wing 115. In an alternate embodiment, the notch 115d is a gap between the tip section 115a of the wing 115 and a remainder of the wing 115. More than one notch 115d may be used. In FIG. 2, only one notch is used and an extremity 115e of the tip section 115a of the wing 115 is located axially inwardly of the duct 18 along the span axis S. Other configurations are possible.

Referring to FIG. 4, an angle of attack A2 defined between the fan axis F and a direction D of an oncoming flow may range from about −20 to about 20 degrees when the aircraft 200 is in the aircraft mode. Having the duct 18 defining a non-zero angle of attack with respect to the oncoming flow may allow the duct 18 to generate lift. In other words, with the rotating duct 18, the blades 16 are attached to the duct 18 which allows for selecting airfoil of the duct 18 to provide more thrust/lift. In this manner, the global efficiency of the propulsion system may be increased. A projection of the fan axis F on the ground may be parallel to a direction of travel T (FIG. 1) of the aircraft 100, when the aircraft 200 is in the aircraft mode.

It may be possible to minimise the weight of the duct 18 because, as discussed above, the duct 18 is not required to support the engine 12 since there are no stators and since it is not necessary to make the duct 18 extra rigid because there are no gaps to minimize between the tips 16b of the blades 16 and the duct 18.

In embodiments, since the duct 18 rotates, there is no need for stators and a structurally rigid duct. Having the blades 16 secured to the duct 18 may eliminate the blade tip gap issue. Having the blades 16 secured to the duct 18 may eliminate blade over stator shadow flow disruptions (i.e. 2 per rev). Having the blades 16 secured to the duct 18 may eliminate propeller coning issue. Increasing a number of the blades 16 may allow the duct 18 to be made lighter because each blade 16 acts as a support for the duct 18.

In an embodiment, a variable pitch system may be used, for instance, if rotational acceleration/decelerations of the ducted fan 10 are found to be beyond acceptable thresholds for control of the aircraft 100. In such an embodiment, the blades 16 may be pivotable about blade axes B (FIG. 3) and relative to the hub 14 and to the duct 18 to vary an angle of attack of the blades 16 relative to the oncoming flow. The blades 16, the hub 14, and the duct 18 may therefore be separate to allow relative motion of the blades 16 with respect to the duct 18 and the hub 14. The tips 16b of the blades 16 may be mounted to the duct 18 via bearings. The bearings may permit rotation of the blades 16 while limiting axial movements of the blades 16 along their blade axes B. The roots 16a of the blades 16 may be in engagement with a system configured to rotate the blades 14 about their blade axes B. This system may be located within the hub 14 to limit a moment of inertia of the duct 18. Limiting axial movements of the blades 16 along their blade axes B may allow to avoid a coning effect. The coning effect is typically exhibited when the tips 16b of the blades 16 are spaced apart from the duct 18 and movable relative to the duct 18. Coning corresponds to a movement of the tips 16b of the blades 16 towards the direction of the lift produced by the blades 16. For the disclosed rotating duct 18, there may be no coning since the tips 16b of the blades 16 are fixed to the duct 18. Avoiding the coning may increase efficiency compared to a configuration in which the duct is non-rotating.

The aircraft 100 may be equipped with a plurality of the ducted fan 10 described above. For counteracting gyroscope effect, a direction of rotation of the ducted fan(s) 10 located on a right-hand side of a center line of the aircraft 100 may be opposite that of the ducted fan(s) 10 located on a left-hand side of the center line of the aircraft 100.

In the present disclosure including claims, the term "about" means that a value varies by plus or minus 10% of the value. For instance, a value of about 10 means that the value ranges from 9 to 11.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. An aircraft comprising:
   a fuselage;

a wing extending from the fuselage along a spanwise axis, a section of the wing rotatable about the spanwise axis and relative to the fuselage; and a ducted fan mounted to the section of the wing, the ducted fan having a hub configured to be drivingly engaged by an engine, the hub rotatable about a fan axis, blades protruding from the hub between roots mounted to the hub and tips radially spaced from the hub, and a duct circumferentially extending about the fan axis and mounted to the tips of the blades to rotate with the blades about the fan axis;

the section of the wing and the ducted fan rotatable about the spanwise axis between a hover mode in which the fan axis is substantially perpendicular to a ground, and an aircraft mode in which the fan axis is substantially parallel to the ground.

2. The aircraft of claim 1, wherein the section of the wing is a tip section of the wing, a portion of the tip section located downstream of the ducted fan relative to a direction of an oncoming flow.

3. The aircraft of claim 1, wherein each of the blades extends along a blade axis, each of the blades being rotatable about the blade axis and relative to the duct and the hub to change an angle of attack of the blades relative to an oncoming flow.

4. The aircraft of claim 1, wherein the fan axis is angled relative to a direction of the oncoming flow.

5. The aircraft of claim 1, wherein the spanwise axis intersects a center of pressure of the section of the wing.

6. The aircraft of claim 1, wherein a cross-sectional shape of the duct taken in a plane containing the fan axis is airfoil-shaped.

7. The aircraft of claim 1, wherein the duct defines a conduit containing the blades, a cross-sectional area of the conduit taken in a plane normal to the fan axis decreasing from a leading edge of the duct to the blades and increasing from the blades to a trailing edge of the duct.

8. The aircraft of claim 1, wherein the engine is secured to a spar embedded within the section of the wing, the spar being rotatable about the spanwise axis.

9. The aircraft of claim 1, wherein a ratio of a chord of the blades at their tips to that at their roots ranges from 10% to 200%.

10. The aircraft of claim 1, wherein tip sections of the blades are defined from about 60% of the span of the blades to the tips, a chord of the blades increasing along the tip sections in a direction towards the tips.

11. The aircraft of claim 1, wherein the section of the wing is an entirety of the wing, the ducted fan secured to a tip of the wing.

12. The aircraft of claim 1, wherein an aft section of the duct is positioned within a notch in the wing.

13. The aircraft of claim 12, wherein the notch is in a leading edge of the section of the wing.

14. The aircraft of claim 1, wherein the blades have leading edges and trailing edges each extending along blade spans from the roots to the tips, the duct extending at least axially relative to the fan axis from a duct leading edge to a duct trailing edge, an entirety of the leading edges of the blades located rearward of the duct leading edge.

15. The aircraft of claim 14, wherein an entirety of the trailing edges of the blades is located forward of the duct trailing edge.

16. The aircraft of claim 1, wherein the section of the wing has a control surface movable relative to a remainder of the section of the wing.

17. The aircraft of claim 16, wherein the control surface is an aileron located downstream of the ducted fan.

18. The aircraft of claim 16, wherein the control surface is axially aligned with the ducted fan relative to the spanwise axis.

* * * * *